(12) United States Patent
Wu et al.

(10) Patent No.: US 11,836,008 B2
(45) Date of Patent: Dec. 5, 2023

(54) CONFIGURABLE COMPONENT RECEPTACLE FOR USE WITH INFORMATION HANDLING SYSTEMS

(71) Applicant: Dell Products L.P., Round Rock, TX (US)

(72) Inventors: Jing-Tang Wu, Xizhi District (TW); Tung-Yi Chen, Banciao (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/709,495

(22) Filed: Mar. 31, 2022

(65) Prior Publication Data
US 2023/0315158 A1 Oct. 5, 2023

(51) Int. Cl.
*G06F 1/16* (2006.01)

(52) U.S. Cl.
CPC ................... *G06F 1/1658* (2013.01)

(58) Field of Classification Search
CPC ............... G06F 1/1658; G06F 1/162
See application file for complete search history.

(56) References Cited

U.S. PATENT DOCUMENTS

| 7,780,465 | B2* | 8/2010 | Priyadarshi | G02B 6/4292 439/352 |
| 11,311,114 | B1* | 4/2022 | Fleisher | A47C 27/065 |

* cited by examiner

*Primary Examiner* — James Wu
(74) *Attorney, Agent, or Firm* — Terrile, Cannatti & Chambers; Stephen A. Terrile

(57) ABSTRACT

A configurable component receptacle which includes a holder portion and a flexible portion, the flexible portion enabling the holder portion of the configurable component receptacle to be in a horizontal configuration and a pivoted configuration, the holder portion and the flexible portion being configured from a single piece of material. The configurable component receptacle is attached to a frame of an information handling system, the configurable component receptable enabling configuration of the information handling system with a plurality of component options.

18 Claims, 11 Drawing Sheets

CONFIGURABLE COMPONENT RECEPTACLE FOR USE WITH INFORMATION HANDLING SYSTEMS

BACKGROUND OF THE INVENTION

Field of the Invention

The present invention relates to information handling systems. More specifically, embodiments of the invention relate to a configurable component receptacle for an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a configurable component receptacle, comprising: a holder portion; and, a flexible portion, the flexible portion enabling the holder portion of the configurable component receptacle to be in a horizontal configuration and a pivoted configuration, the holder portion and the flexible portion being configured from a single piece of material; and wherein the configurable component receptacle is attached to a frame of an information handling system, the configurable component receptable enabling configuration of the information handling system with a plurality of component options.

In another embodiment the invention relates to a main housing portion of an information handling system, comprising: a top cover portion; a bottom cover portion coupled to the top cover portion; a frame mounted between the top cover portion and the bottom cover portion and a configurable component receptacle, comprising: a holder portion; and, a flexible portion, the flexible portion enabling the holder portion of the configurable component receptacle to be in a horizontal configuration and a pivoted configuration, the holder portion and the flexible portion being configured from a single piece of material; and wherein the configurable component receptacle is attached to a frame of an information handling system, the configurable component receptable enabling configuration of the information handling system with a plurality of component options.

In another embodiment the invention relates to an information handling system comprising: a processor; a data bus coupled to the processor; and an information handling system chassis housing, the housing comprising a base chassis, the base chassis housing the processor, the base chassis comprising a top cover portion; a bottom cover portion coupled to the top cover portion; a frame mounted between the top cover portion and the bottom cover portion and a configurable component receptacle, comprising: a holder portion; and, a flexible portion, the flexible portion enabling the holder portion of the configurable component receptacle to be in a horizontal configuration and a pivoted configuration, the holder portion and the flexible portion being configured from a single piece of material; and wherein the configurable component receptacle is attached to a frame of an information handling system, the configurable component receptable enabling configuration of the information handling system with a plurality of component options.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Various aspects of the present disclosure include an appreciation that certain types of portable information handling systems can have multiple internal component configurations. For example, certain types of portable information handling systems can include a plurality of solid state drive options (e.g., a 2230 SSD or a 2280 SSD) as well as a plurality of battery options (e.g., a 3-cell battery or a 4-cell battery). Various aspects of the present disclosure include an appreciation that when the portable information handling systems can have multiple internal component configurations, it is often necessary to have corresponding specifically designed receptacles, where each of the specifically designed receptacles may include a plurality of different pieces.

Accordingly, in certain embodiments a configurable component receptacle is disclosed to address these issues. In various embodiments, the configurable component receptacle is integrated into a frame of an information handling system. In various embodiments, the configurable component receptacle is injection molded with the frame. In various embodiments, the configurable component receptacle includes a holder portion, a flexible portion and an attachment portion. In various embodiments, the flexible portion allows the holder portion to flip and stretch depending on the component configuration of the information handling system.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
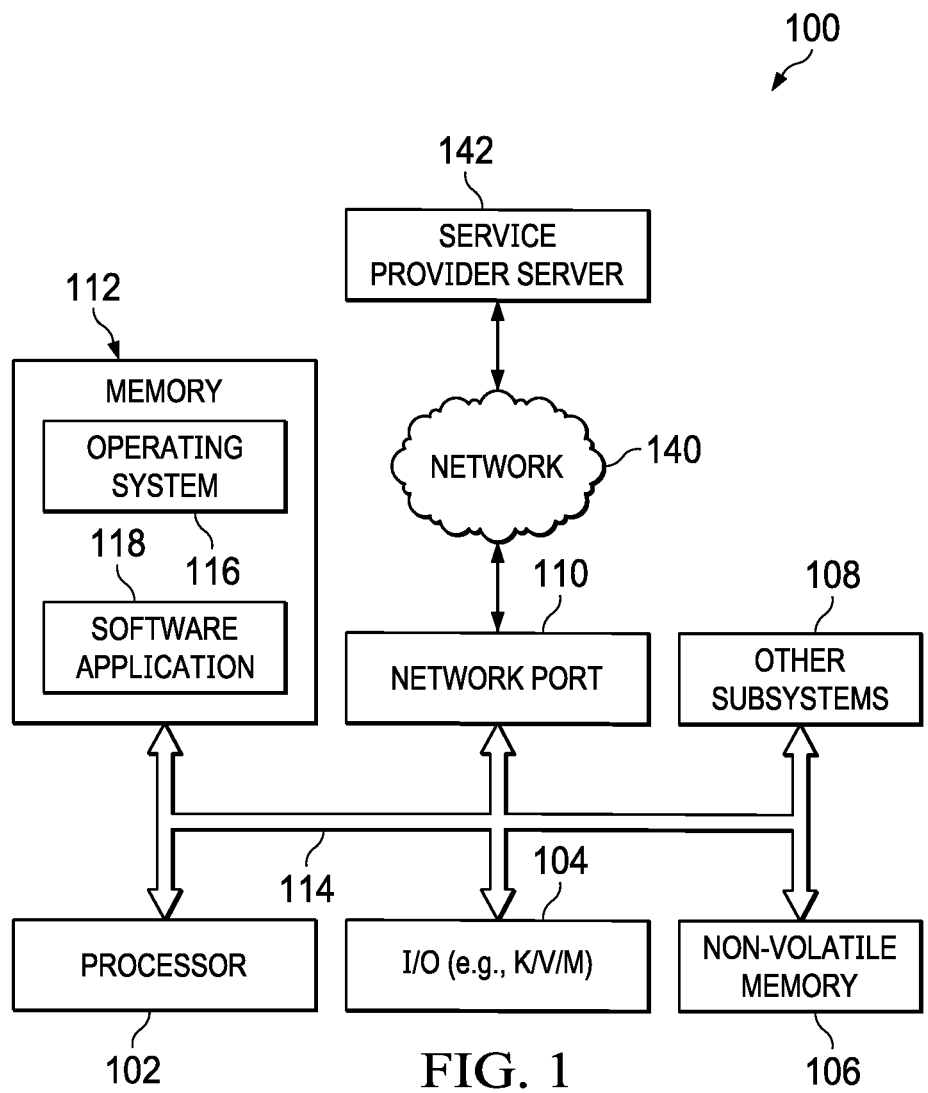
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise at least one software application 118. In one embodiment, the information handling system 100 is able to download the software application from the service provider server 142. In another embodiment, the software application 118 is provided as a service from the service provider server 142.

Figure 2:
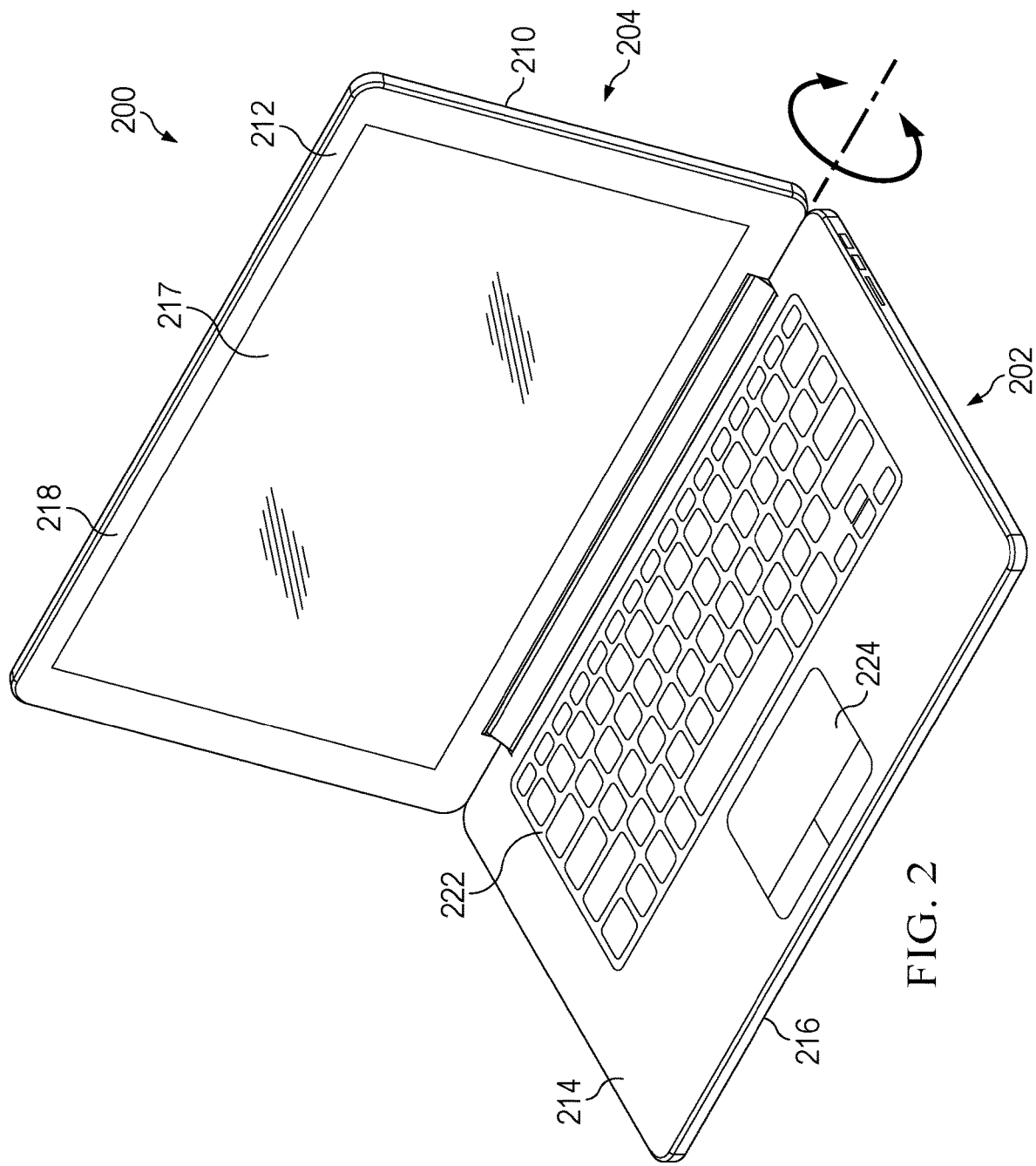
FIG. 2 shows a perspective view of an example portable information handling system.

FIG. 2 shows a perspective view of an example portable information handling system chassis 200 such as a tablet type portable information handling system, a laptop type portable information handling system, or any other mobile information handling system. It will be appreciated that some or all of the components of the information handling system 100 may be included within information handling system chassis 200. The portable information handling system 200 chassis includes a base chassis 202 and a display chassis 204 shown in an open configuration. It will be appreciated that a closed configuration would have the display chassis 204 fully closed onto the base chassis 202.

The base chassis 202 or the display chassis 204 of the information handling system 200 may comprise an outer metal case or shell. The information handling system 200 may include a plurality of chassis portions. In various embodiments, the information handling system 200 may include some or all of an A-Cover 210, a B-Cover 212, a C-cover 214 and a D-Cover 216. In various embodiments, the A-Cover 210 and the B-Cover 212 provide the display chassis 204. In various embodiments, the C-Cover 214 and the D-Cover 216 provide the base chassis 202.

In various embodiments, the A-cover 210 encloses a portion of the display chassis 204 of the information handling system 200. In various embodiments, the B-cover 212 encloses another portion of the display chassis 204 of the information handling system 200. In various embodiments, the B-Cover may include a display screen 217 and a bezel 218 around the display screen.

In various embodiments, the C-cover 214 encloses a portion of the base chassis 202 of the information handling system 200. In various embodiments, the C-cover 214 may include, for example, a keyboard 222, a trackpad 224, or other input/output (I/O) device. In various embodiments, certain components of the information handling system such as a mother board are mounted within the C-Cover 214. In various embodiments, the D-cover 216 encloses another portion of the base chassis 202 of the information handling system 200.

When placed in the closed configuration, the A-cover 210 forms a top outer protective shell, or a portion of a lid, for the information handling system 200, while the D-cover 216 forms a bottom outer protective shell, or a portion of a base, for the information handling system. When in the fully closed configuration, the A-cover 210 and the D-cover 216 would be substantially parallel to one another.

In some embodiments, both the A-cover 210 and the D-cover 216 may be comprised entirely of metal. In some embodiments, the A-cover 210 and D-cover 216 may include both metallic and plastic components. For example, plastic components that are radio-frequency (RF) transparent may be used to form a portion of the C-cover 214.

In various embodiments, the display chassis 204 may be movably connected to a back edge of the base chassis 202 via one or more hinges. In this configuration, the hinges allow the display chassis 204 to rotate from and to the base chassis 202 allowing for multiple orientations of the information handling system 200. In various embodiments, the information handling system may include a sensor to detect the orientation of the information handling system and activate or deactivate any number of antenna systems based on the occurrence of any specific orientation. In some embodiments, the information handling system may be a laptop with limited rotation of the display chassis 204 with regard to the base chassis 202, for example up to 180° rotation arc. In other embodiments the information handling system 200 may be a convertible information handling system with full rotation to a tablet configuration.

Figure 3:
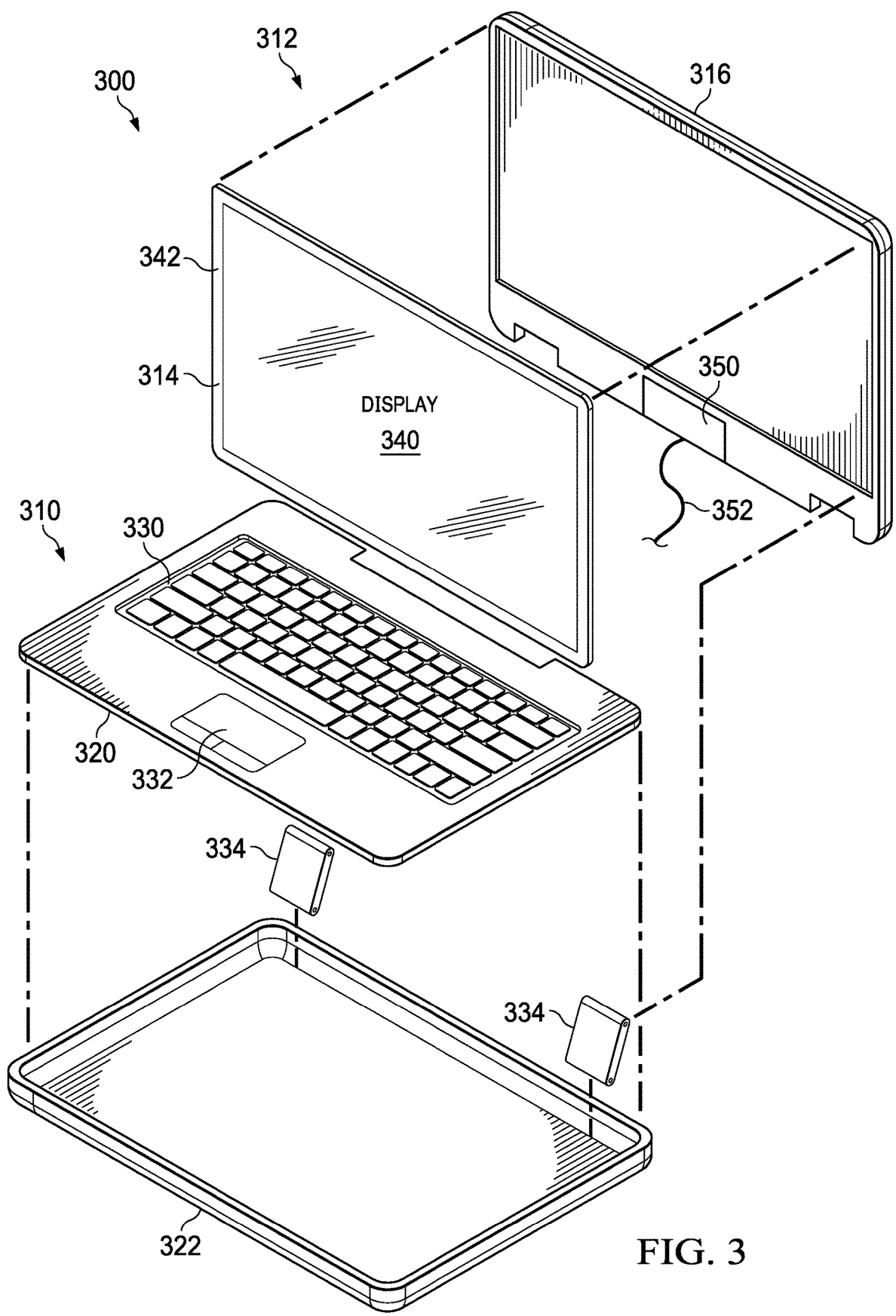
FIG. 3 shows a blown-up view of a portable information handling system.

FIG. 3 shows a blown-up view of a portable information handling system 300 having rotationally—coupled housing portions. In the example embodiment, a main housing portion 310 (which corresponds to a base chassis 202) rotationally couples to a lid housing portion 312 (which corresponds to a display chassis 204) to support various configurations to interact with an end user. Main housing portion 310 may hold one or more components of the portable information handling system, including but not limited to processor 102, system bus 114, memory subsystem 112, I/O subsystem 104 and network interface 110 discussed with respect to FIG. 1. Main housing portion 310 includes a top cover portion 320 (which includes the C-Cover 214) and a bottom cover portion 322 (which includes the D-Cover 216). Lid housing portion 312 includes a display cover portion 314 (which includes the B-Cover 212) and a rear display cover portion 316 (which includes the A-Cover 210). The top cover portion 320 may include an integrated keyboard 330 or other I/O devices, such as a trackpad 332 or microphone (not shown). In various embodiments, the keyboard 330 may be mounted to the top of the C-Cover of the main housing portion 310. In various embodiments, the keyboard 330 may be mounted to the underside of the C-Cover of the main housing portion 310.

Lid housing portion 312 is rotationally coupled to main housing portion 310 via at least one hinge assembly 334. Lid housing portion 312 includes display 340 that visually presents information to the user as well as a bezel 342. Display 340 may be a touch panel with circuitry enabling touch functionality in conjunction with a display. In some embodiments, display 340 may be an "infinity edge" or "narrow bezel" display that approaches one or more the edges of lid housing portion 312 such that bezel may be narrow in size (e.g., less than 10 millimeters) on the edges. For example, display 340 is an infinity display with narrow bezels on the top and sides of lid housing portion 312 in the embodiment shown in FIG. 3. In certain embodiments, the side bezel is less than 4 mm (+/−10%) and the top bezel is less than 6 mm (+/−10%).

Lid housing portion 312 may also include timing controller (TCON) 350. Hinge assembly 330 may include cable 352 for communicably coupling one or more components within main housing portion 310 to one or more components within lid housing portion 312. For example, cable 352 may provide communication of graphics information from an I/O subsystem to TCON 350 for generation of visual images for display on display 340. Although a single cable 352 is shown, portable information handling system 300 may include one or more additional cables 352 for communicating components disposed in main housing portion 310 and lid housing portion 312. Placement of cable 352 may be selected based on design considerations, materials or manufacturing cost, material reliability, antenna placement, as well as any other considerations.

Hinge assembly 334 allows main housing portion 310 and lid housing portion 312 to rotate between a plurality of positions. For example, when portable information handling system 300 is not in use, lid housing portion 312 may be closed over the top of main portion 310 such that display 340 and keyboard 330 are protected from unintended use or damage. Rotation of lid housing portion 312 by approximately 90 degrees from main housing portion 310 brings display 340 in a raised "clamshell" position relative to keyboard 330 so that an end user can make inputs to keyboard 330 or touch panel portion of display 340 while viewing display 340. In some embodiments, clamshell position may represent lid housing portion 312 open between approximately 1 and 180 degrees from main housing portion 310. Rotation of lid housing portion 312 between approximately 180 and 359 degrees from main housing portion 310 may place portable information handling system 300 in "tablet stand" and/or "tent" positions. In tablet stand and tent positions, the user may make inputs via touch panel portion of display 340 while viewing display 340. A full 360 degree rotation of main housing portion 310 relative to lid housing portion 312 provides a tablet configuration having display 340 exposed to accept touch inputs. In any position, user inputs may be communicated to an I/O subsystem or a processor of the portable information handling system 300 for processing, and then updated information may be communicated back via cable 352 to display 340 for displaying to the user. Hinge assembly 334 may be comprised of one or more discrete hinges or a unified assembly of hinges.

Figure 4:
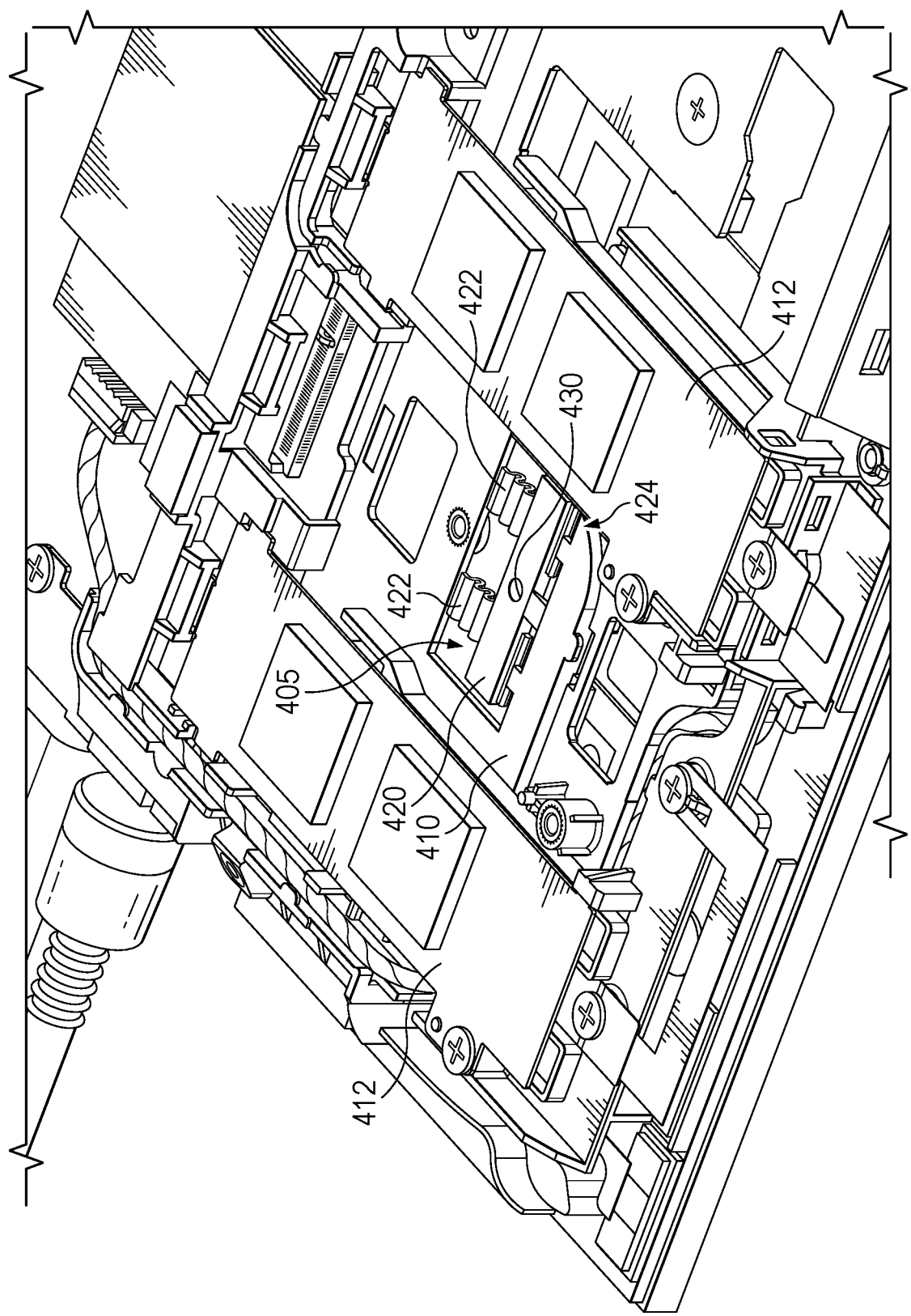
FIG. 4 shows a cut away perspective view of a portion of a main housing portion of an information handling system having a configurable component receptacle.
Figure 5:
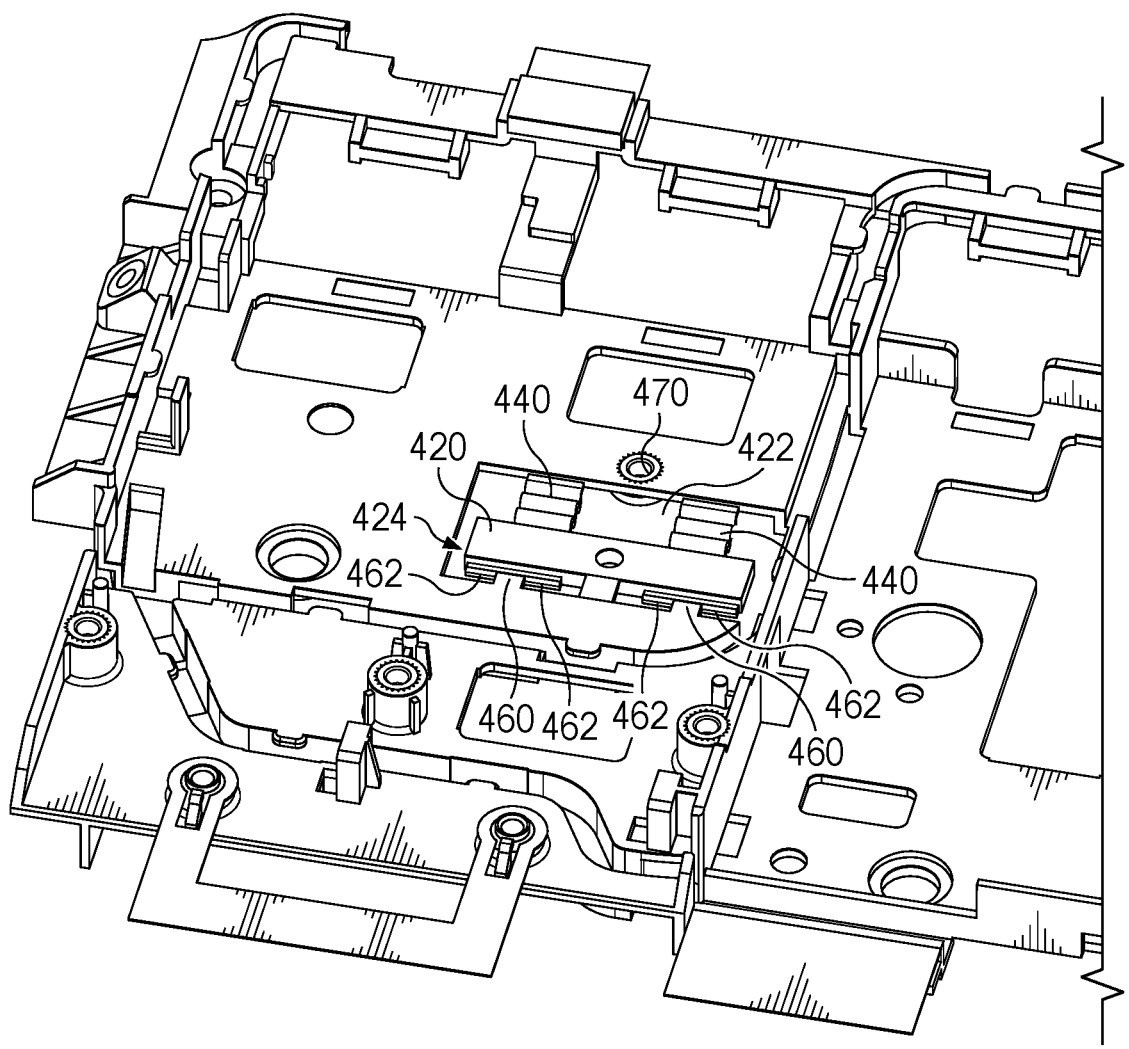
FIG. 5 shows a perspective view of a portion of a frame of a main housing portion of an information handling system having a configurable component receptacle.
Figure 6:
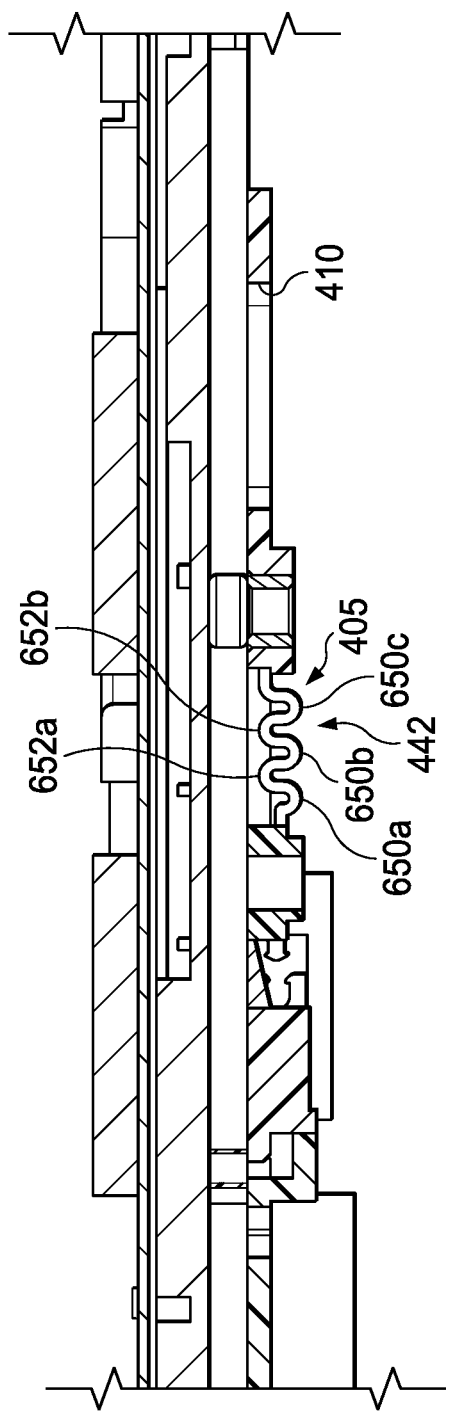
FIG. 6 shows a side view of a portion of a main housing portion of an information handling system having a configurable component receptacle.

FIG. 4 shows a cut away perspective view of a portion of a main housing portion 400 of an information handling system having a configurable component receptacle 405. FIG. 5 shows a perspective view of a portion of a frame 410 of a main housing portion 400 of an information handling system having a configurable component receptacle 405. FIG. 6 shows a side view of a portion of a main housing portion 400 of an information handling system having a configurable component receptacle 405.

In various embodiments, the main housing portion 400 includes a main housing portion frame 410. In certain embodiments, the configurable component receptacle 405 is mounted to the main housing portion frame 410. In certain embodiments, one or more solid state drive (SSD) components 412 are mounted to the frame 410 of the main housing portion 400. In various embodiments, the solid state drive components include a PCIe 2230 SSD. In certain embodiments, one or more batteries are included within the main housing portion 400. In various embodiments, the batteries include a one or more of a thin profile battery and a thick profile battery. In various embodiments, the batteries include one or more of a 3-cell battery and a 4-cell battery.

In various embodiments, the configurable component receptacle 405 includes a holder portion 420, a flexible portion 422 and an attachment portion 424. In certain embodiments, the holder portion 420, the flexible portion 422 and the attachment portion 424 are configured from a single piece of material. In certain embodiments, the holder portion 420, the flexible portion 422 and the attachment portion 424 are fabricated as a single piece of plastic. In certain embodiments, the holder portion 420, the flexible portion 422 and the attachment portion 424 are fabricated via an injection molding process. The configurable component receptable 405 enables configuration of the information handling system with a plurality of component options such as a plurality of solid state drive component configurations.

In certain embodiments, the holder portion 420 defines an aperture 430. In certain embodiments, the flexible portion 422 provides a horizontal extension function via which the holder portion 420 may be horizontally extended. In certain embodiments, the flexible portion provides a holder rotation function via which the holder portion 420 may be pivotably rotated from a first position to a second position. In certain embodiments, the flexible portion is configured as a spring. In certain embodiments, the attachment component 424 includes a hook structure 432.

In certain embodiments, one end of the flexible portion 422 is affixed to the frame 410. In certain embodiments, another end of the flexible portion 422 is affixed to the holder portion 420. In certain embodiments, the flexible portion 422 includes a plurality of flexible members 440. In certain embodiments, each of the plurality of flexible members 440 are affixed to the frame 410.

In certain embodiments, the frame 410 includes one or more tabs 460. In certain embodiments, the tabs 460 interact with the attachment portion 424. In certain embodiments, the attachment portion 424 includes one or more projections 462. In certain embodiments, the one or more projections 462 are configured to mate with the tabs 460 of the frame 410. In certain embodiments, the frame 410 includes a nut 470.

In certain embodiments the flexible portion 422 includes one or more curved elements 442. In certain embodiments the one or more curved elements 442 are continuously connected. In certain embodiments, the one or more curved elements form alternating semi-circular arcs. In certain embodiments, the one or more curved elements comprise three lower curved elements 650a, 650b and 650c. In certain embodiments, the one or more curved elements comprise two upper curved elements 652a and 652b.

Figure 7:
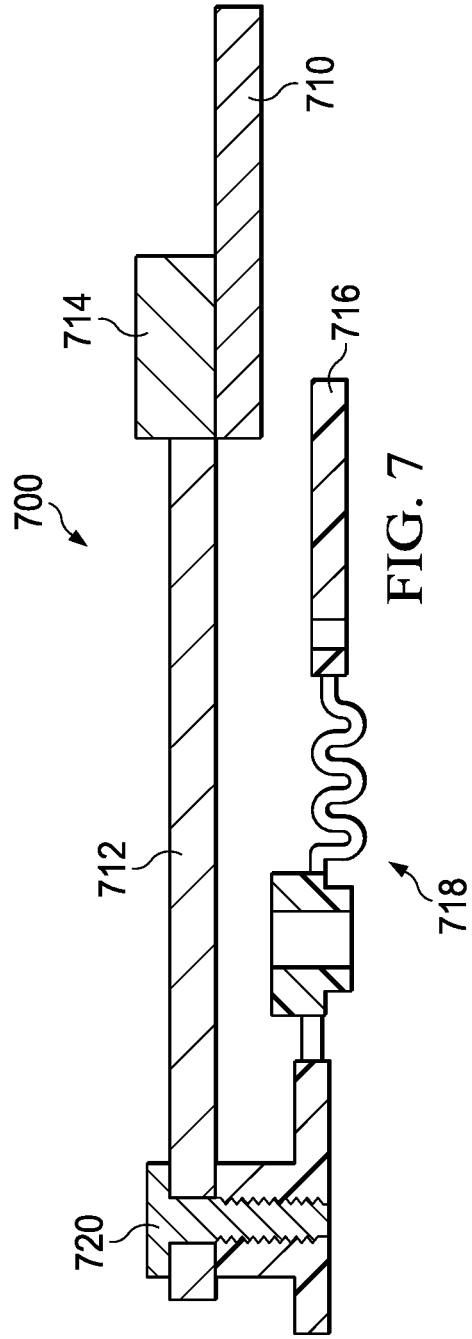
FIG. 7 shows a diagrammatic side view of a main housing portion of an information handling system having a configurable component receptacle.

FIG. 7 shows a diagrammatic side view of a main housing portion 700 of an information handling system having a configurable component receptacle. In certain embodiments, the main housing portion 700 includes a motherboard 710, a storage component 712, a storage component connector 714, a frame 716, and a configurable component receptacle 718. In certain embodiments, the storage component connector 714 physically and electrically connects the storage component 714 with the motherboard 710. In certain embodiments, the main housing portion 700 includes a fastener 720. In various embodiments, the fastener physically connects the storage component 714 to the frame 714.

In various embodiments, the main housing portion 700 corresponds to main housing portion 400. In various embodiments, the storage component 712 is an example of component 412. In various embodiments, the frame 714 corresponds to frame 410. In various embodiments, the configurable component receptacle 718 corresponds to configurable storage receptacle 405.

Figure 8:
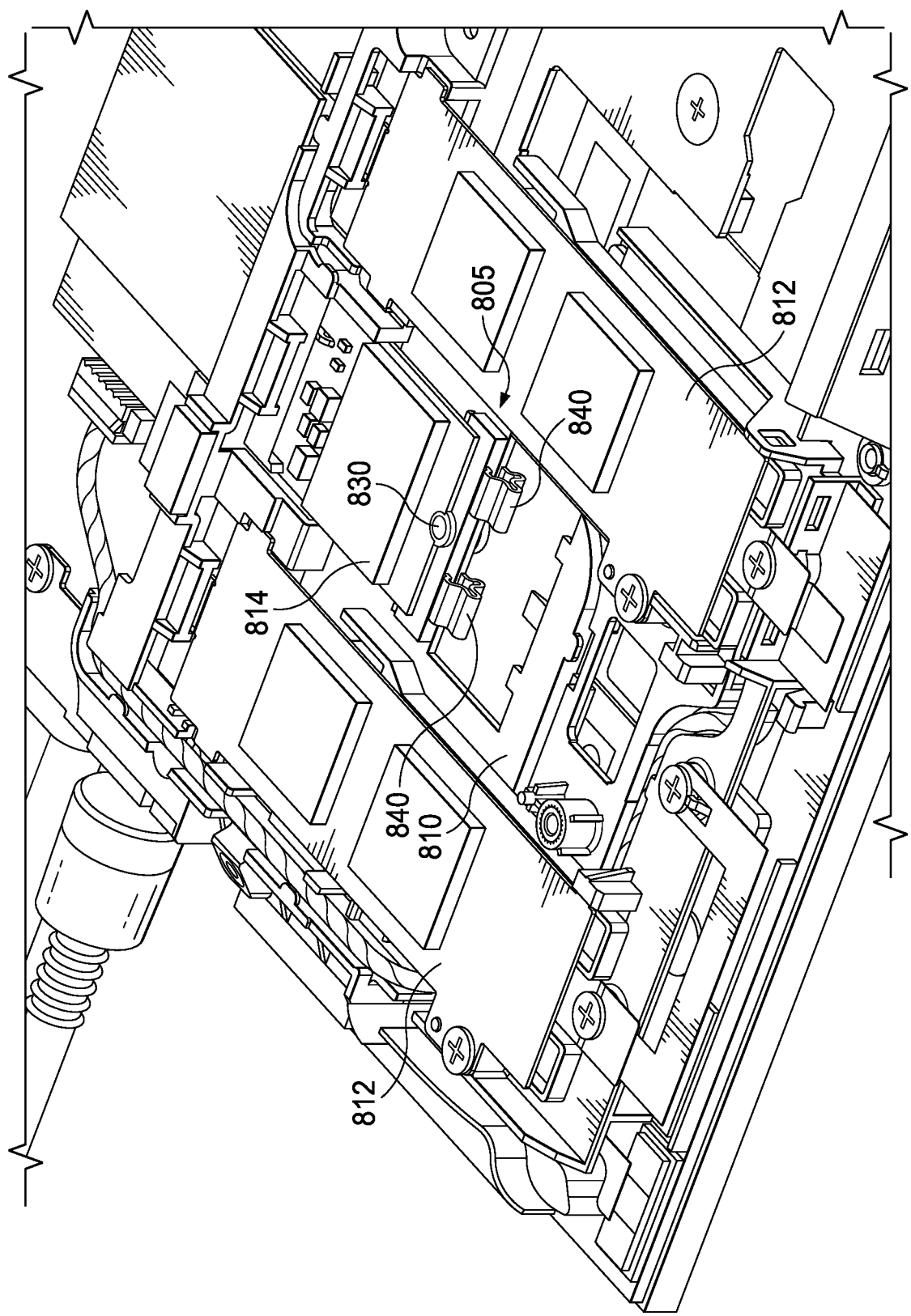
FIG. 8 shows a cut away perspective view of a portion of a main housing portion of an information handling system having a configurable component receptacle in another configuration.
Figure 9:
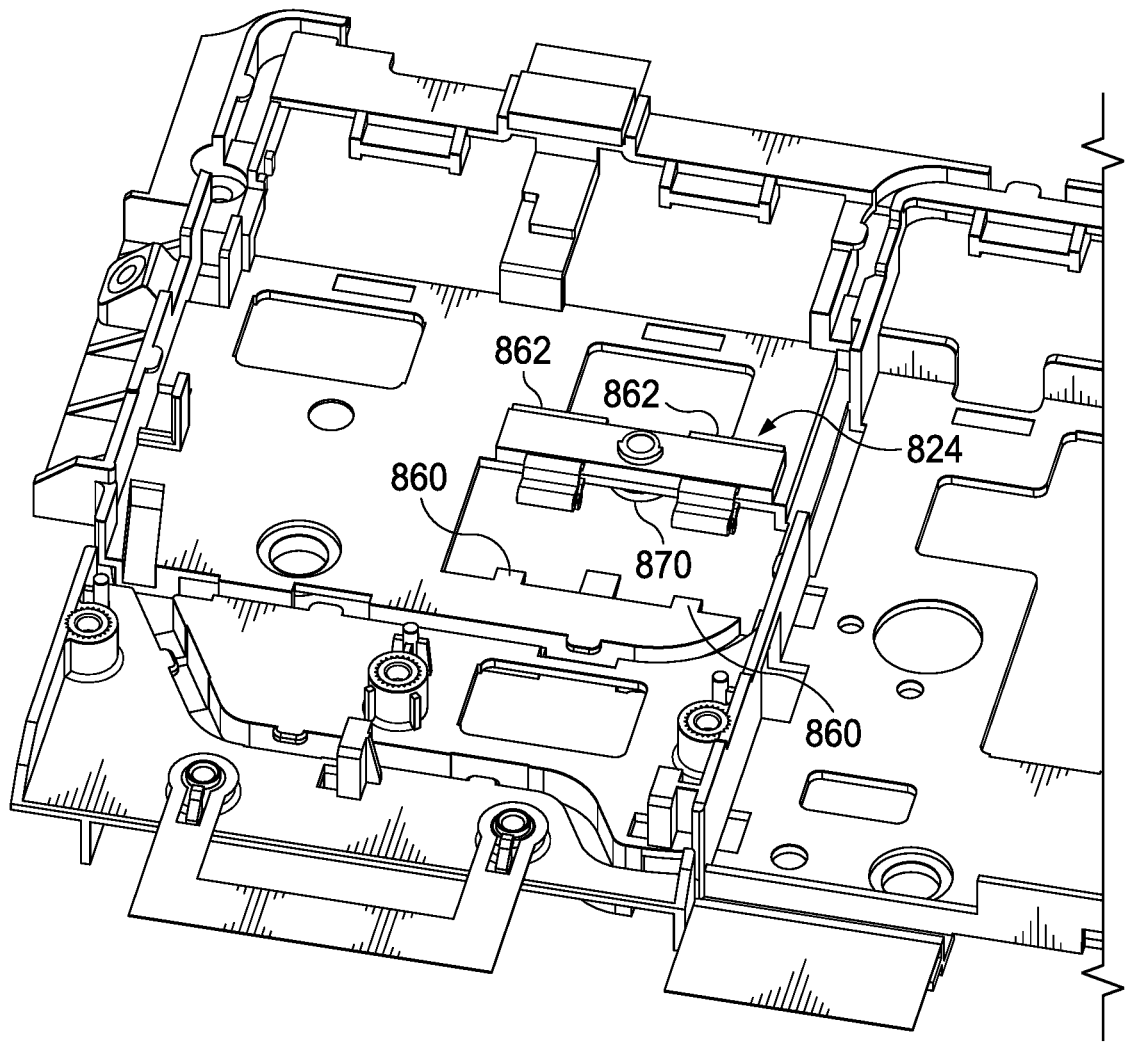
FIG. 9 shows a perspective view of a portion of a frame of a main housing portion of an information handling system having a configurable component receptacle in another configuration.
Figure 10:
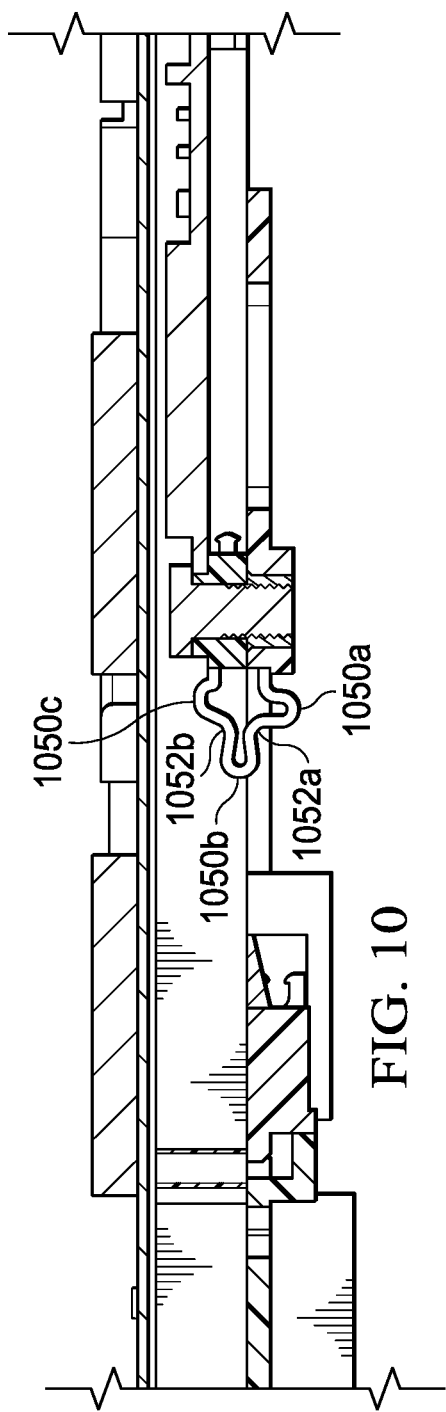
FIG. 10 shows a side view of a portion of a main housing portion of an information handling system having a configurable component receptacle in another configuration.

FIG. 8 shows a cut away perspective view of a portion of a main housing portion 800 of an information handling system having a configurable component receptacle 805 in a pivoted configuration. FIG. 9 shows a perspective view of a portion of a frame 810 of a main housing portion 800 of an information handling system having a configurable component receptacle 805. FIG. 10 shows a side view of a portion of a main housing portion 800 of an information handling system having a configurable component receptacle 805.

In various embodiments, the main housing portion 800 includes a main housing portion frame 810. In certain embodiments, the configurable component receptacle 805 is mounted to the main housing portion frame 810. In certain embodiments, one or more solid state drive (SSD) components 812, 814 are mounted to the frame 810 of the main housing portion 800. In various embodiments, the solid state drive components include one or more of a PCIe 2230 SSD and a PCIe 2280 SSD. In certain embodiments, the component 414 is attached to the frame 810 via the configurable component receptacle 805.

In various embodiments, the main housing portion 800 corresponds to main housing portion 400. In various embodiments, the storage component 812 is an example of component 412. In various embodiments, the frame 810 corresponds to frame 410. In various embodiments, the configurable component receptacle 805 corresponds to configurable storage receptacle 405 with the configurable component receptacle 805 being in another configuration when compared with the configuration of configurable component receptacle 405. In various embodiments, configurable component receptable 805 is in a pivoted configuration when compared to the straight configuration of configurable component receptacle 405.

In various embodiments, the configurable component receptacle 805 includes a holder portion 820, a flexible portion 822 and an attachment component 824. In certain embodiments, the holder portion 820, the flexible portion 822 and the attachment component 824 are configured from a single piece of material. In certain embodiments, the holder portion 820, the flexible portion 822 and the attachment portion 826 are fabricated as a single piece of plastic. In certain embodiments, the holder portion 820, the flexible portion 822 and the attachment portion 826 are fabricated via an injection molding process.

In certain embodiments, the holder portion 820 defines an aperture 830. In certain embodiments, the holder portion 820 is affixed to the frame 810 via a fastener (not shown in FIG. 8) that is passed through the aperture 830 and is attached to the frame 810.

In certain embodiments, the flexible portion 822 enables the holder portion to be pivotably rotated from a first position to a second position. In certain embodiments, the flexible portion is configured as a spring. In certain embodiments, one end of the flexible portion 822 is affixed to the frame 810. In certain embodiments, another end of the flexible portion 822 is affixed to the holder portion 820. In certain embodiments, the flexible portion 822 includes a plurality of flexible members 840. In certain embodiments, each of the plurality of flexible members 840 are affixed to the frame 810.

In certain embodiments, one end of the flexible portion 822 is affixed to the frame 810. In certain embodiments, another end of the flexible portion 822 is affixed to the holder portion 820. In certain embodiments, the flexible portion 822 incudes a plurality of flexible members 840. In certain embodiments, each of the plurality of flexible members 840 are affixed to the frame 810.

In certain embodiments, the frame 810 includes one or more tabs 860. In certain embodiments, the attachment portion 824 includes one or more projections 862. In certain embodiments, the frame 810 includes a nut 870. In certain embodiments, a fastener is passed through the aperture 830 and is affixed to the frame 810 via the nut 870.

In certain embodiments the flexible portion 822 includes one or more curved elements 842. In certain embodiments the one or more curved elements 842 are continuously connected. In certain embodiments, the one or more curved elements form alternating semi-circular arcs. In certain embodiments, the one or more curved elements comprise three outwardly extending curved elements 1050a, 1050b and 1050c. In certain embodiments, the three outwardly extending curved elements 1050a, 1050b and 1050c correspond to the three lower curved elements 650a, 650b and 650c. In certain embodiments, the one or more curved elements comprise two inwardly extending curved elements 1052a and 1052b. In certain embodiments, the two inwardly extending curved elements 1052a and 1052b correspond to the two upper curved elements 652a and 652b.

Figure 11:
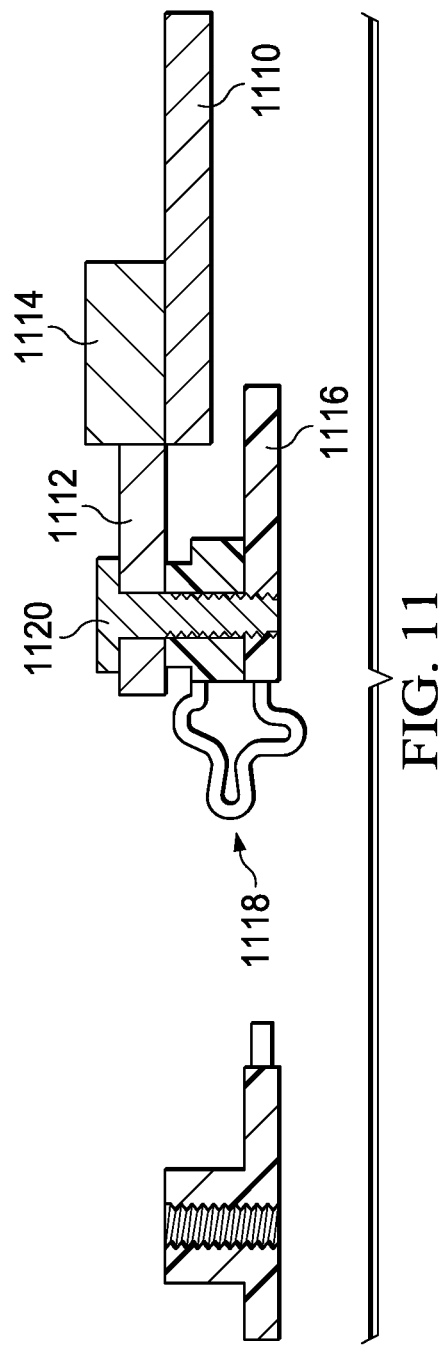
FIG. 11 shows a diagrammatic side view of a main housing portion of an information handling system having a configurable component receptacle in another configuration.

FIG. 11 shows a diagrammatic side view of a main housing portion of an information handling system having a configurable component receptacle in a pivoted configuration. In certain embodiments, the main housing portion 1100 includes a motherboard 1110, a storage component 1112, a storage component connector 1114, a frame 1116, and a configurable component receptacle 1118. In certain embodiments, the storage component connector 1114 physically and electrically connects the storage component 1114 with the motherboard 1110. In certain embodiments, the main housing portion 1100 includes a fastener 1120. In various embodiments, the fastener physically connects the storage component 1114 to the frame 1114.

In various embodiments, the main housing portion 1100 corresponds to main housing portion 400. In various embodiments, the storage component 1112 is an example of component 412. In various embodiments, the frame 1114 corresponds to frame 410. In various embodiments, the configurable component receptacle 1118 corresponds to configurable storage receptacle 405.

Figure 12:
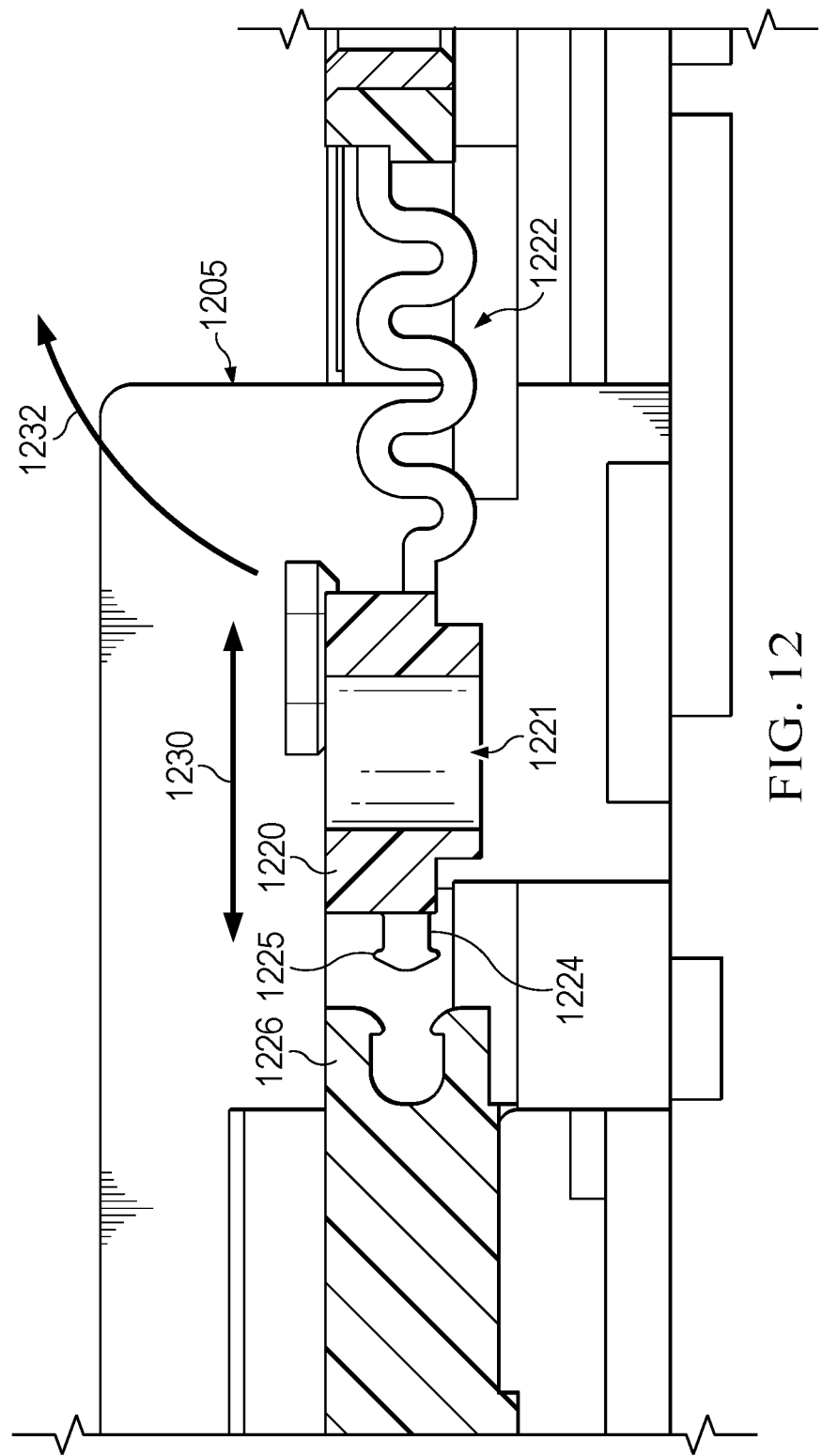
FIG. 12 shows a side view of a configurable component receptacle.

FIG. 12 shows a side view of a configurable component receptacle 1205 in a flat configuration. In various embodiments, the configurable component receptacle 1205 includes a holder portion 1220, a flexible portion 1222 and an attachment component 1224. In certain embodiments, the holder portion 1220, the flexible portion 1222 and the attachment component 1224 are configured from a single piece of material. In certain embodiments, the holder portion 1220, the flexible portion 1222 and the attachment portion 1226 are fabricated as a single piece of plastic. In certain embodiments, the holder portion 1220, the flexible portion 1222 and the attachment portion 1226 are fabricated via an injection molding process.

In certain embodiments, the holder portion 1220 defines an aperture 1221. In certain embodiments, the flexible portion 1222 provides a horizontal extension function via which the holder portion 1220 may be horizontally extended 1230. In certain embodiments, the flexible portion provides a holder rotation function via which the holder portion 1220 may be pivotably rotated 1232 from a first position to a second position. In certain embodiments, the flexible portion is configured as a spring. In certain embodiments, the attachment component 1224 includes a hook structure 1226.

In certain embodiments, one end of the flexible portion 1222 is affixed to the frame 1210. In certain embodiments, another end of the flexible portion 1222 is affixed to the holder portion 1220. In certain embodiments, the flexible portion 1222 includes a plurality of flexible members 1240. In certain embodiments, each of the plurality of flexible members 1240 are affixed to the frame 1210.

In certain embodiments, the frame 1210 includes one or more tabs 1260. In certain embodiments, the tabs 1260 interact with the attachment portion 1224. In certain embodiments, the attachment portion 1224 includes one or more projections 1262. In certain embodiments, the one or more projections 1262 are configured to mate with the tabs 1260 of the frame 1210. In certain embodiments, the frame 1210 includes a nut 1270.

In certain embodiments the flexible portion 1222 includes one or more curved elements 1242. In certain embodiments the one or more curved elements 1242 are continuously connected. In certain embodiments, the one or more curved elements form alternating semi-circular arcs. In certain embodiments, the one or more curved elements comprise three lower curved elements. In certain embodiments, the one or more curved elements comprise two upper curved elements.

In various embodiments, the main housing portion 1200 corresponds to main housing portion 400. In various embodiments, the storage component 1212 is an example of component 412. In various embodiments, the frame 1214 corresponds to frame 410. In various embodiments, the configurable component receptacle 1218 corresponds to configurable storage receptacle 405.

Figure 13:
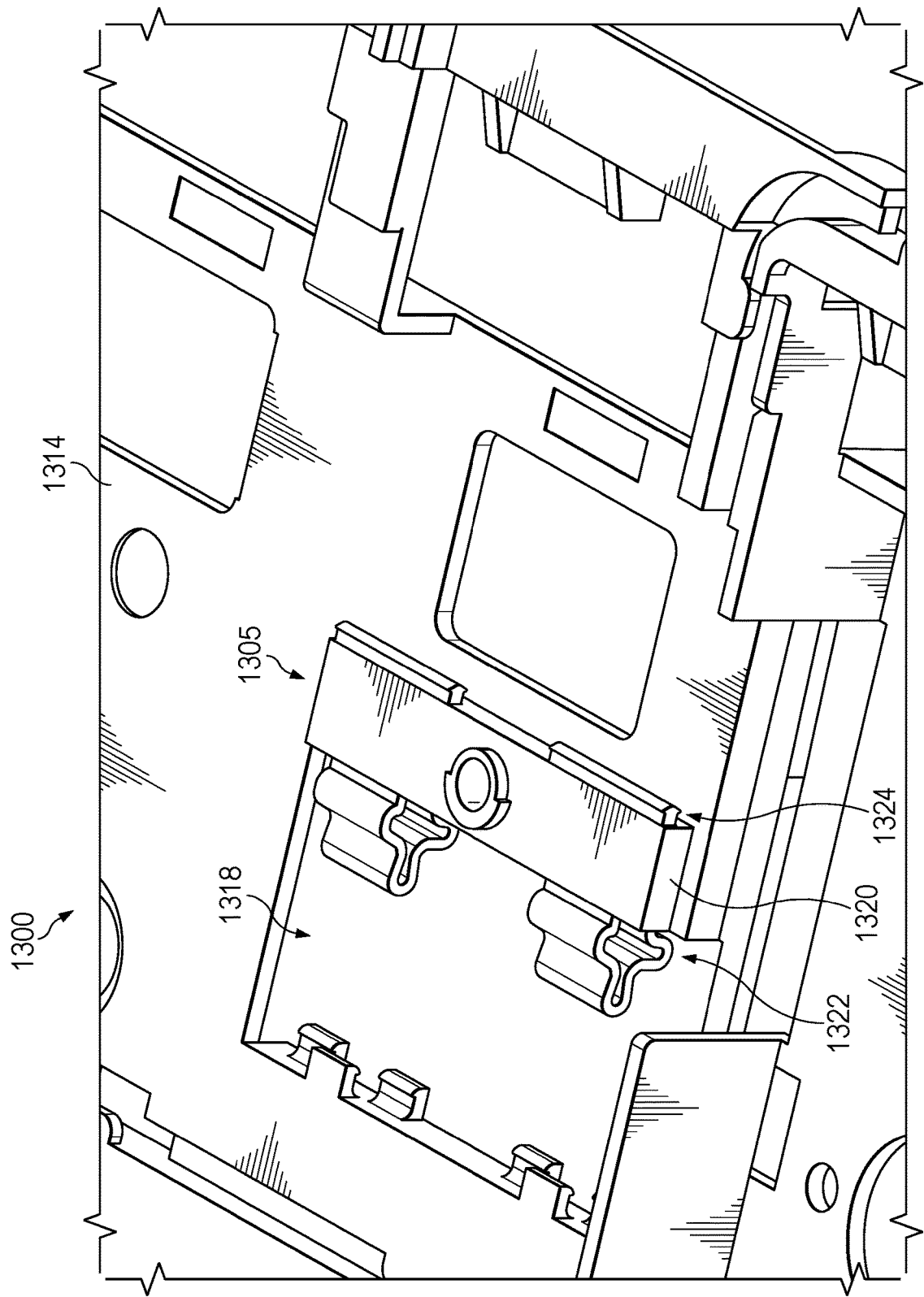
FIG. 13 shows a perspective view of a configurable component receptacle in another configuration.

FIG. 13 shows a perspective view of a configurable component receptacle 1305 in a pivoted configuration. In various embodiments, the configurable component receptacle 1305 includes a holder portion 1320, a flexible portion 1322 and an attachment component 1324. In certain embodiments, the holder portion 1320, the flexible portion 1322 and the attachment component 1324 are configured from a single piece of material. In certain embodiments, the holder portion 1320, the flexible portion 1322 and the attachment portion 1326 are fabricated as a single piece of plastic. In certain embodiments, the holder portion 1320, the flexible portion 1322 and the attachment portion 1326 are fabricated via an injection molding process. In certain embodiments, the attachment portion 1324 is configured to attach a component to the frame when the configurable component receptacle is in the pivoted configuration.

In various embodiments, the main housing portion 1300 corresponds to main housing portion 400. In various embodiments, the storage component is an example of component 412. In various embodiments, the frame 1314 corresponds to frame 410. In various embodiments, the configurable component receptacle 1318 corresponds to configurable storage receptacle 405.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A configurable component receptacle, comprising:
   a holder portion; and,
   a flexible portion, the flexible portion enabling the holder portion of the configurable component receptacle to be in a horizontal configuration and a pivoted configuration, the holder portion and the flexible portion being configured from a single piece of material; and wherein
   the configurable component receptacle is attached to a frame of an information handling system, the configurable component receptacle enabling configuration of the information handling system with a plurality of component options;
   the flexible portion enables the holder portion to be horizontally extended so that the holder portion can be attached to the frame when in the horizontal configuration;

the flexible portion enables the holder portion to be pivotably rotated from a first position to a second position; and, when in the second position, the holder portion is positioned parallel with the frame to which the configurable component is attached.

2. The configurable component receptacle of claim 1, further comprising:

an attachment portion, the attachment portion attaching the holder portion to the frame when the configurable component receptacle is in the horizontal configuration.

3. The configurable component receptacle of claim 1, wherein:

the flexible portion is configured as a spring.

4. The configurable component receptacle of claim 1, wherein:

the flexible portion includes a plurality of lower curved elements and a plurality of upper curved elements interspersed between pairs of lower curved elements.

5. The configurable component receptacle of claim 4, wherein:

the flexible portion includes three lower curved elements and two upper curved elements; and, the two upper curved elements are interspersed between respective pairs of the three lower curved elements.

6. The configurable component receptacle of claim 1, wherein:

the holder portion defines an aperture, the holder portion being attached to the frame via a fastener that is passed through the aperture when the configurable component receptacle is in the pivoted configuration.

7. A main housing portion of an information handling system, comprising:

a top cover portion;

a bottom cover portion coupled to the top cover portion;

a frame mounted between the top cover portion and the bottom cover portion; and, a configurable component receptacle, comprising a holder portion; and, a flexible portion, the flexible portion enabling the holder portion of the configurable component receptacle to be in a horizontal configuration and a pivoted configuration, the holder portion and the flexible portion being configured from a single piece of material; and wherein the configurable component receptacle is attached to the frame of the main housing portion of the information handling system, the configurable component receptacle enabling configuration of the information handling system with a plurality of component options; and, the flexible portion enables the holder portion to be horizontally extended so that the holder portion can be attached to the frame when in the horizontal configuration;

the flexible portion enables the holder portion to be pivotably rotated from a first position to a second position; and, when in the second position, the holder portion is positioned parallel with the frame to which the configurable component is attached.

8. The main housing portion of claim 7, where the configurable component receptacle further comprises:

an attachment portion, the attachment portion attaching the holder portion to the frame when the configurable component receptacle is in the horizontal configuration.

9. The main housing portion of claim 7, wherein:

the flexible portion is configured as a spring.

10. The main housing portion of claim 7, wherein:

the flexible portion includes a plurality of lower curved elements and a plurality of upper curved elements interspersed between pairs of lower curved elements.

11. The main housing portion of claim 10, wherein:

the flexible portion includes three lower curved elements and two upper curved elements;

the two upper curved elements are interspersed between respective pairs of the three lower curved elements.

12. The main housing portion of claim 7, wherein:

the holder portion defines an aperture, the holder portion being attached to the frame via a fastener that is passed through the aperture when the configurable component receptacle is in the pivoted configuration.

13. An information handling system comprising:

a processor;

a data bus coupled to the processor; and an information handling system chassis housing, the housing comprising a base chassis, the base chassis housing the processor, the base chassis comprising a top cover portion;

a bottom cover portion coupled to the top cover portion;

a frame mounted between the top cover portion and the bottom cover portion; and, a configurable component receptacle, comprising a holder portion; and, a flexible portion, the flexible portion enabling the holder portion of the configurable component receptacle to be in a horizontal configuration and a pivoted configuration, the holder portion and the flexible portion being configured from a single piece of material; and wherein the configurable component receptacle is attached to the frame of the main housing portion of the information handling system, the configurable component receptacle enabling configuration of the information handling system with a plurality of component options; and, the flexible portion enables the holder portion to be horizontally extended so that the holder portion can be attached to the frame when in the horizontal configuration.

14. The information handling system of claim 13, the configurable component receptacle further comprises:

an attachment portion, the attachment portion attaching the holder portion to the frame when the configurable component receptacle is in the horizontal configuration.

15. The information handling system of claim 13, wherein:

the flexible portion is configured as a spring.

16. The information handling system of claim 13, wherein:

the flexible portion includes a plurality of lower curved elements and a plurality of upper curved elements.

17. The information handling system of claim 13, wherein:

the flexible portion includes three lower curved elements and two upper curved elements.

18. The information handling system of claim 13, wherein:
   the holder portion defines an aperture, the holder portion being attached to the frame via a fastener that is passed through the aperture when the configurable component receptacle is in the pivoted configuration.

\* \* \* \* \*